United States Patent
Keller

(10) Patent No.: US 8,930,082 B2
(45) Date of Patent: Jan. 6, 2015

(54) STEERING METHOD AND STEERING SYSTEM FOR AN INDUSTRIAL TRUCK

(75) Inventor: Juergen Keller, Grossenlueder (DE)

(73) Assignee: Hubtex Maschinenbau GmbH & Co. KG, Fulda (DE)

( * ) Notice: Subject to any disclaimer, the term of this patent is extended or adjusted under 35 U.S.C. 154(b) by 165 days.

(21) Appl. No.: 13/640,741

(22) PCT Filed: Apr. 5, 2011

(86) PCT No.: PCT/EP2011/055228
§ 371 (c)(1),
(2), (4) Date: Oct. 12, 2012

(87) PCT Pub. No.: WO2011/128222
PCT Pub. Date: Oct. 20, 2011

(65) Prior Publication Data
US 2013/0030656 A1 Jan. 31, 2013

(30) Foreign Application Priority Data
Apr. 16, 2010 (DE) .................. 10 2010 016 470

(51) Int. Cl.
B66F 9/075 (2006.01)
B62D 7/02 (2006.01)
B62D 7/15 (2006.01)
B62D 5/04 (2006.01)

(52) U.S. Cl.
CPC ............ *B62D 7/026* (2013.01); *B60Y 2200/15* (2013.01); *B62D 5/0418* (2013.01); *B62D 7/1509* (2013.01); *B66F 9/07568* (2013.01)
USPC ............... 701/42; 701/50; 180/402; 180/408; 180/415

(58) Field of Classification Search
CPC .... B62D 7/026; B62D 7/1509; B62D 5/0418; B66F 9/07568; B60Y 2200/15
See application file for complete search history.

(56) References Cited

U.S. PATENT DOCUMENTS

| | | | |
|---|---|---|---|
| 4,263,979 A * | 4/1981 | Sturgill | 180/411 |
| 5,325,935 A | 7/1994 | Hirooka et al. | |
| 5,365,440 A * | 11/1994 | Abe et al. | 701/41 |
| 6,554,084 B1 | 4/2003 | Enmeiji | |
| 6,580,988 B2 * | 6/2003 | Lin et al. | 701/41 |
| 6,793,036 B1 * | 9/2004 | Enmeiji et al. | 180/411 |
| 2004/0007414 A1 * | 1/2004 | Sugata | 180/411 |
| 2004/0149498 A1 | 8/2004 | Nakashima | |
| 2007/0289798 A1 * | 12/2007 | Kaufmann | 180/253 |

FOREIGN PATENT DOCUMENTS

| | | |
|---|---|---|
| DE | 693 29 156 T2 | 1/2001 |
| DE | 199 41 883 A1 | 3/2001 |
| DE | 201 17 198 U1 | 3/2002 |
| DE | 603 06 313 T2 | 6/2007 |
| EP | 0 625 478 A1 | 11/1994 |
| EP | 0 712 805 A2 | 5/1996 |
| EP | 0 712 805 B1 | 8/2000 |
| EP | 1 118 581 A1 | 7/2001 |
| JP | 5116643 A | 5/1993 |

* cited by examiner

*Primary Examiner* — Michael J Zanelli
(74) *Attorney, Agent, or Firm* — Norman B. Thot

(57) ABSTRACT

A steering method for an industrial truck includes manually steering at least one steerable wheel with a steering transducer. The at least one steerable wheel is hydraulically connected or mechanically connected with the steering transducer. An angular position of the at least one steerable wheel is detected. At least one additional steerable wheel is motor-steered as a function of the detected angular position.

9 Claims, 2 Drawing Sheets

STEERING METHOD AND STEERING SYSTEM FOR AN INDUSTRIAL TRUCK

CROSS REFERENCE TO PRIOR APPLICATIONS

This application is a U.S. National Phase application under 35 U.S.C. §371 of International Application No. PCT/EP2011/055228, filed on Apr. 5, 2011 and which claims benefit to German Patent Application No. 10 2010 016 470.4, filed on Apr. 16, 2010. The International Application was published in German on Oct. 20, 2011 as WO 2011/128222 A1 under PCT Article 21(2).

FIELD

The present invention relates to a steering method of an industrial truck, in which, by means of a steering transducer, in particular a steering wheel, at least one steerable wheel is steered manually by a hydraulic or mechanical connection with the steering transducer. The present invention furthermore relates to a steering system for an industrial truck having a steering transducer, in particular a steering wheel, having a hydraulic steering valve with which the steering transducer is mechanically connected, and having at least a first hydraulic steering motor for steering at least one manually steerable first wheel, which motor is hydraulically connected with the steering transducer, as well as to an industrial truck equipped with such a steering system.

BACKGROUND

Steering methods and steering systems which work purely manually are known for industrial trucks. They have the disadvantage that different steering programs, for example, for operation of the industrial truck in longitudinal, transverse, or diagonal driving, cannot be implemented, or can only be implemented with significant mechanical effort.

In order to eliminate this disadvantage, so-called "steer-by-wire" steering systems have become known which bring about steering movements of the steerable wheels using steering motors. The steering motors are controlled in each instance by a steering computer as a function of the activation of the steering transducer and of the steering program selected.

DE 199 41 883 A1, for example, describes such a steering system where the steering activation of the steering transducer, for example, of the steering wheel, takes place without any feedback concerning the driving state of the industrial truck. Because steering is uniformly easy, independent of the driving state of the industrial truck, critical driving situations resulting from steering movements not appropriate to the speed can arise at higher speeds.

In order to increase driving safety, it is known, in "steer-by-wire" steering systems, to connect the steering transducer mechanically with a steering force simulator, which is supposed to generate steering and reset forces in the steering transducer as a function of the driving state, in each instance. However, in "steer-by-wire" steering systems configured in this manner, the effort and expenditure connected with the steering force simulator is disadvantageous, as is an increased technical susceptibility, and the problem that true-to-life simulation of the steering and reset forces is possible only with restrictions.

SUMMARY

An aspect of the present invention is to provide a steering method and a steering system for industrial trucks that allows operation of the industrial truck in different steering programs, while simultaneously maintaining the driving sensation in the steering transducer.

In an embodiment, the present invention provides a steering method for an industrial truck which includes manually steering at least one steerable wheel with a steering transducer. The at least one steerable wheel is hydraulically connected or mechanically connected with the steering transducer. An angular position of the at least one steerable wheel is detected. At least one additional steerable wheel is motor-steered as a function of the detected angular position.

BRIEF DESCRIPTION OF THE DRAWINGS

The present invention is described in greater detail below on the basis of embodiments and of the drawings in which.

DETAILED DESCRIPTION

Figure 1:
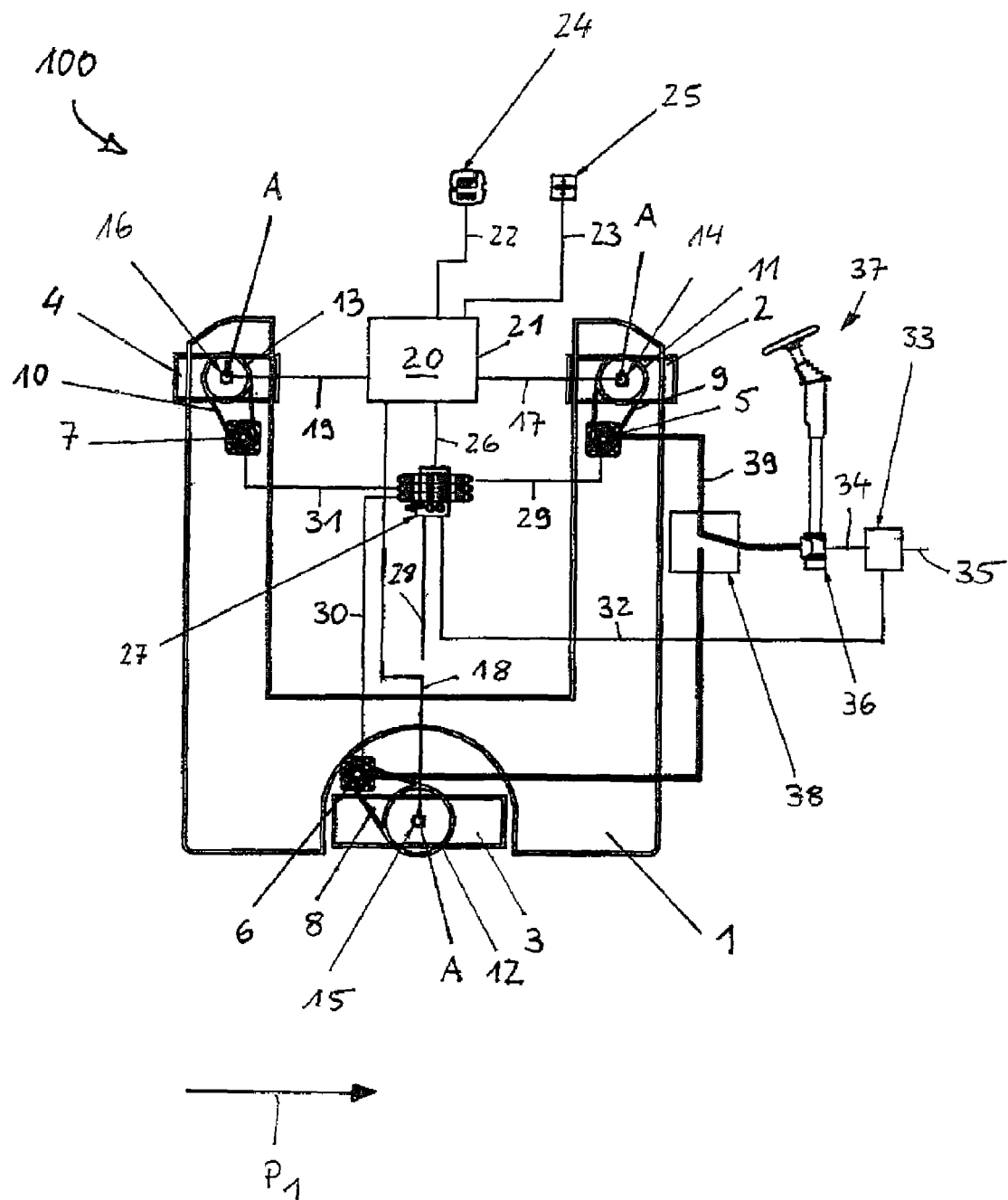
FIG. 1 schematically shows a block schematic of a steering system according to the present invention using the example of an industrial truck having three wheels, in longitudinal travel.

In the steering method of an industrial truck according to the present invention, by means of a steering transducer, in particular a steering wheel, at least one steerable wheel is manually steered by a hydraulic or mechanical connection with the steering transducer. In this way, the steering transducer, in particular the steering wheel, imparts the same driving sensation to the driver as in conventional, purely manual steering of the steered wheels. According to the present invention, the angular positions of the at least one manually steered wheel are detected, and at least one further motor-driven steerable wheel is steered as a function of the detected angular position. This motor-driven steering can now take place not only (as in the case of a steering system having a purely mechanical action) analogous to the steering movements of the manually steered wheel, but rather completely independent of these movements in accordance with a preselected steering program, if, for example, the angular position of the manually steered wheel is passed to a steering control device and the at least one motor-driven steerable wheel is steered by this device as a function of the preselected steering program.

The steering method according to the present invention therefore combines the advantages of purely manual steering methods with those of "steer-by-wire" steering methods.

In order to be able to move industrial trucks even under very restricted conditions, for example, in halls with storage shelves that stand close together, it is advantageous and known to provide that the wheels of all axles in industrial trucks are steerable, and to provide two different steering programs in which the wheels, in the straight-ahead direction, can be steered out differently, by 90° relative to a fixed directional axis of the vehicle. Because of this measure, a change in travel direction of the industrial truck by 90° does not require driving along a curve, but rather the vehicle, after having been stopped in longitudinal travel, for example, can be moved further in transverse travel, after the steering program has been changed. If the steered axle by way of the wheels of which the driving sensation can best be imparted changes when switching from longitudinal to transverse travel, for example, then after the change in travel direction, the at least one previously motor-driven steered wheel is steered manually, and the at least one previously manually steered wheel is steered in a motor-driven manner.

In an embodiment of the present invention, at least one wheel can, for example, be steered manually, for example, hydraulically, in one travel direction, for example, in transverse travel, and not be steered at all in another travel direction, for example, in longitudinal travel.

The steering system according to the present invention has at least one steering angle sensor that detects the steering angle of the at least one manually steered first wheel. This sensor is connected to work together with a steering control device. The steering system according to the present invention also comprises at least one further steerable, motor-driven steered second wheel, the steering motor of which can be driven as a function of a steering angle reference value generated by the steering control device.

The motor-driven steering of the second wheel can fundamentally take place in any desired manner, for example, also electronically. A hydraulic steering motor can, for example, be provided for activation of the second wheel.

In an embodiment of the present invention, the steering system can, for example, have a switch-over valve, by means of which the steering valve is optionally connected with the first hydraulic steering motor or the second hydraulic steering motor, and the other hydraulic motor, in each instance, is then driven by way of the steering control device, the first and second steering motors can, for example, be configured with the same construction. Measures that allow adaptation of the hydraulic action as a function of the hydraulic steering motor, in each instance, can then be eliminated.

In an embodiment of the present invention, the steering control device can, for example, be configured as a steering computer which comprises a device for storing multiple steering programs.

The steering angle sensors can then, for example, be configured as electrical or electronic steering angle sensors.

The present invention also covers an industrial truck having a steering system as described above.

The present invention will now be explained using the example of an exemplary embodiment.

In the Figures, the chassis 1 of an industrial truck indicated as a whole with 100 is shown schematically. All the wheels 2, 3, 4 are disposed so as to be steerable about axes A that run perpendicular to the plane of the drawing.

To pivot the wheels 2, 3, 4, steering motors 5, 6, 7 assigned to one of the wheels, in each instance, are provided, which motors are coupled, in each instance, with a flexible tension element 8, 9, 10, for example, a chain or toothed belt, with a steering activation wheel 11, 12, 13. Each steering activation wheel is connected so as to rotate with a steering shaft, not shown in the drawing, which defines the axis A, in each instance.

A steering angle sensor 14, 15, 16, which works electrically or electronically, for example, is provided on each of the steering activation wheels 11, 12, 13. The steering angle sensor 14 is connected with a steering control device 20 by way of a signal line 17, the steering angle sensor 15 by way of a signal line 18, and the steering angle sensor 16 by way of a signal line 19; this device is configured as a steering computer 21 having a device for storing multiple steering programs. The steering computer 21 is connected with devices for steering program selection 24 and for travel direction preselection 25 by way of additional signal lines 22, 23.

The steering control device 20 is further connected with a steering block 27 by way of a signal line 26. This steering block 27 is a multi-valve arrangement that individually passes hydraulic fluid supplied by a hydraulic pump (not shown in the drawing), by way of a hydraulic line 28, to the steering motors 5, 6, 7, by way of hydraulic lines 29, 30, 31, as a function of the signals applied by way of the signal line.

The steering block 27 is further connected with a priority valve 33 by way of a hydraulic line 32. By way of the hydraulic line 32, the priority valve 33 is supplied with hydraulic fluid not required for activation of the steering motors 5, 6, 7. The latter pass hydraulic fluid (to the extent that it is required for steering activation support) to a steering orbitrol 36, by way of a hydraulic line 34, otherwise to a work control block (not shown in the drawing) for activation of further hydraulically activated components of the industrial truck, by way of a hydraulic line 35.

A steering transducer 37 in the form of a steering wheel serves for activation of the steering orbitrol 36 and is mechanically connected therewith.

In the steering system state shown in FIG. 1, in which the vehicle is in a longitudinal travel direction symbolized by the arrow P1, the steering orbitrol 36 is directly connected with the first steering motor 5 of the first wheel 2, by way of a hydraulic line 39, using a switch-over valve 38. Reset forces generated by this motor during driving operation are transferred to the steering transducer 37 and can therefore be felt as a driving sensation. The steering angle of the first wheel 2, in each instance, is passed to the steering control device 20 by way of the first steering angle sensor 14 and the signal line 17. This device then activates the further (second) steering motors 6, 7 of the further (second) wheels 3, 4, as a function of the signals applied by way of the signal line 26, in order to bring about the required steering angle, in each instance.

In the exemplary embodiment of the industrial truck 100 shown, by means of a steering transducer 37 in the form of a steering wheel, a steerable wheel is manually steered by a hydraulic connection with the steering transducer. In longitudinal travel, shown in FIG. 1, the wheel 2 is steered manually by means of a hydraulic connection with the steering transducer, and in transverse travel, shown in FIG. 2, the wheel 3 is steered manually by means of a hydraulic connection with the steering transducer.

Figure 2:
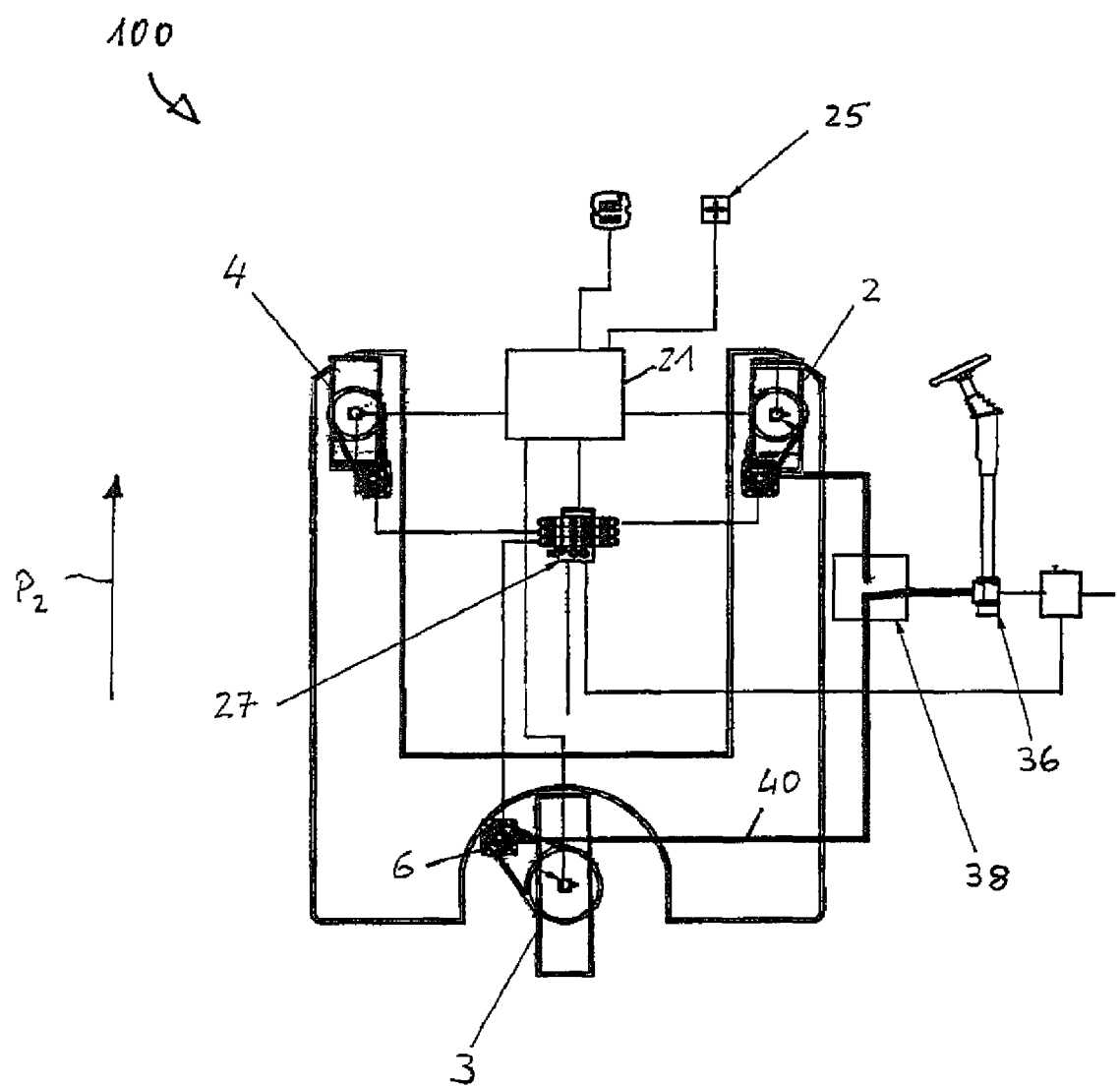
FIG. 2 schematically shows the same block schematic of the steering system using the example of the same industrial truck, in transverse travel.

If a change now takes place from the longitudinal travel shown in FIG. 1 to the transverse travel shown in FIG. 2 and symbolized by the arrow P2, by way of the device for travel direction preselection 25, the steering computer 21 controls the steering block 27 in such a manner that first, all the wheels 2, 3, 4 are pivoted by 90° by way of the hydraulic lines 29, 30, 31. At the same time, the switch-over valve 38 is switched over to the hydraulic line 40 that leads to the steering motor 6 of the wheel 3, so that the steering orbitrol 36 is now directly connected with the steering motor 6 of the wheel 3, and steering reaction forces of this wheel can be felt in the steering transducer 37. In contrast to the wheel 3, which now is steered manually, the wheels 2 and 4 remain rigid, or, depending on the steering program, are steered in motor-driven manner, by means of hydraulic fluid supplied by way of the steering block 27.

In one exemplary embodiment, the wheel 3 is not steered in the longitudinal travel shown in FIG. 1. In this exemplary embodiment, the wheel 3 is therefore activated exclusively in transverse travel, and then directly hydraulically.

The present invention is not limited to embodiments described herein; reference should be had to the appended claims.

REFERENCE SYMBOL LIST 100 industrial truck
1 chassis
2 wheel
3 wheel
4 wheel
5 steering motor
6 steering motor
7 steering motor
8 flexible tension element
9 flexible tension element
10 flexible tension element
11 steering activation wheel
12 steering activation wheel
13 steering activation wheel
14 steering angle sensor
15 steering angle sensor
16 steering angle sensor
17 signal line
18 signal line
19 signal line
20 steering control device
21 steering computer
22 signal line
23 signal line
24 device for steering program selection
25 device for travel direction preselection
26 signal line
27 steering block
28 hydraulic line
29 hydraulic line
30 hydraulic line
31 hydraulic line
32 hydraulic line
33 priority valve
34 hydraulic line
35 hydraulic line
36 steering orbitrol
37 steering transducer
38 switch-over valve
39 hydraulic line
40 hydraulic line
A axes
P1 arrow
P2 arrow

What is claimed is:

1. A steering method for an industrial truck, the steering method comprising:
   manually steering at least one steerable wheel with a steering transducer, wherein the at least one steerable wheel is hydraulically connected or mechanically connected with the steering transducer;
   detecting an angular position of the at least one steerable wheel; and
   motor-steering at least one additional steerable wheel as a function of the detected angular position,
   wherein, for a 90° change of a travel direction of the industrial truck, the method comprises:
   steering the at least one steerable wheel and the at least one additional wheel by 90°;
   manually steering the at least one additional wheel; and
   motor-steering the at least one steerable wheel.

2. The steering method as recited in claim 1, wherein the steering transducer is a steering wheel.

3. The steering method as recited in claim 1, further comprising:
   providing the detected angular position to a steering control device;
   providing a preselectable steering program; and
   steering the at least one additional steerable wheel with the steering control device as a function of the preselectable steering program.

4. A steering system for an industrial truck, the steering system comprising:
   a steering transducer;
   a steering unit connected with the steering transducer via a mechanical connection;
   at least one manually steerable first wheel;
   a first hydraulic steering motor configured to steer the at least one manually steerable first wheel, the first hydraulic steering motor being connected with the steering transducer via a hydraulic connection;
   a steering control device configured to generate a steering angle reference value;
   at least one steering angle sensor configured to detect a steering angle of the at least one manually steerable first wheel, the at least one steering angle sensor being connected to work together with the steering control device;
   at least one additional steerable motor-steered second wheel comprising a steering motor, the steering motor being configured to be driven as a function of the steering angle reference value generated by the steering control device;
   a second hydraulic steering motor, wherein the at least one additional steerable motor-steered second wheel is connected to work together with the second hydraulic steering motor; and
   a switch-over valve, wherein the switch-over valve is configured to switch between a hydraulic connection of the steering unit with the first hydraulic steering motor and a hydraulic connection of the steering unit with the second hydraulic steering motor.

5. The steering method as recited in claim 4, wherein the steering transducer is a steering wheel.

6. The steering system as recited in claim 4, wherein the first hydraulic steering motor and the second hydraulic steering motor are identically constructed.

7. The steering system as recited in claim 4, wherein the steering control device is a steering computer comprising a device for storing multiple steering programs.

8. The steering system as recited in claim 4, wherein the at least one steering angle sensor is configured as an electrical steering angle sensor or as an electronic steering angle sensor.

9. An industrial truck comprising the steering system as recited in claim 4.

* * * * *